United States Patent
Wang et al.

(10) Patent No.: US 9,713,126 B2
(45) Date of Patent: Jul. 18, 2017

(54) DYNAMIC TRANSMISSION SET INDICATION

(75) Inventors: Xiao Yi Wang, Beijing (CN); Timo Erkki Lunttila, Espoo (FI); Peter Skov, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 118 days.

(21) Appl. No.: 13/978,891

(22) PCT Filed: Jan. 10, 2011

(86) PCT No.: PCT/CN2011/070155
§ 371 (c)(1),
(2), (4) Date: Jul. 10, 2013

(87) PCT Pub. No.: WO2012/094803
PCT Pub. Date: Jul. 19, 2012

(65) Prior Publication Data
US 2013/0279344 A1  Oct. 24, 2013

(51) Int. Cl.
*H04W 28/18* (2009.01)
*H04W 72/04* (2009.01)

(52) U.S. Cl.
CPC ....... *H04W 72/0406* (2013.01); *H04W 28/18* (2013.01)

(58) Field of Classification Search
CPC .. H04W 28/18; H04W 72/0406; H04W 24/10
See application file for complete search history.

(56) References Cited

U.S. PATENT DOCUMENTS

| | | | |
|---|---|---|---|
| 2009/0245169 A1* | 10/2009 | Zhang | H04L 1/0026 370/328 |
| 2010/0034146 A1* | 2/2010 | Hou et al. | 370/328 |
| 2010/0273514 A1* | 10/2010 | Koo et al. | 455/501 |
| 2010/0285810 A1 | 11/2010 | Ko et al. | |
| 2010/0291940 A1* | 11/2010 | Koo et al. | 455/450 |

(Continued)

FOREIGN PATENT DOCUMENTS

| | | |
|---|---|---|
| CN | 101594644 A | 12/2009 |
| CN | 101815331 A | 8/2010 |

(Continued)

OTHER PUBLICATIONS

3GPP TSG RAN WG1 Meeting # 57, San Francisco, USA, May 4-8, 2009; "Mixed CoMP Operation"; R1-092114; 4 pgs.

(Continued)

*Primary Examiner* — Jeffrey M Rutkowski
*Assistant Examiner* — Thomas D Busch
(74) *Attorney, Agent, or Firm* — Harrington & Smith (57) ABSTRACT

The present invention proposes methods and apparatuses and computer program products for dynamic transmission set indication in scenarios in which a terminal is enabled for single cell transmission SiC as well as for coordinated multipoint transmission CoMP. To this extent, appropriate information is being fed back from the terminal to the base station via feedback signaling channels. The decision on which transmission mode defined by respective transmission set definitions is used can be taken by the terminal or, in a modified scenario, by the base station, based on the information fed back.

21 Claims, 5 Drawing Sheets

(56) References Cited

U.S. PATENT DOCUMENTS

| | | | |
|---|---|---|---|
| 2010/0309996 A1* | 12/2010 | Lim et al. ............... | 375/260 |
| 2011/0085460 A1* | 4/2011 | Zhang et al. ............. | 370/252 |
| 2012/0051257 A1* | 3/2012 | Kim et al. ............... | 370/252 |
| 2012/0076038 A1* | 3/2012 | Shan ............... | H04B 7/026 |
| | | | 370/252 |
| 2012/0087273 A1* | 4/2012 | Koo et al. ............... | 370/252 |
| 2012/0188904 A1* | 7/2012 | Koo et al. ............... | 370/252 |
| 2012/0188976 A1* | 7/2012 | Kim et al. ............... | 370/329 |
| 2012/0287875 A1* | 11/2012 | Kim et al. ............... | 370/329 |
| 2013/0058307 A1* | 3/2013 | Kim et al. ............... | 370/329 |
| 2013/0242921 A1* | 9/2013 | Kim et al. ............... | 370/329 |
| 2013/0258897 A1* | 10/2013 | Park ............... | H04B 7/0626 |
| | | | 370/252 |
| 2013/0258992 A1* | 10/2013 | Seo et al. ............... | 370/329 |
| 2014/0010318 A1* | 1/2014 | Kim et al. ............... | 375/267 |

FOREIGN PATENT DOCUMENTS

| | | | | |
|---|---|---|---|---|
| CN | 101931989 A | 12/2010 | | |
| GB | WO 2012028205 A1 * | 3/2012 | ............ | H04B 7/024 |
| KR | WO 2010134792 A1 * | 11/2010 | ............ | H04B 7/026 |
| WO | WO2010/126339 A2 | 11/2010 | | |
| WO | WO-2012/028205 A1 * | 3/2012 | ............... | H04B 7/04 |
| WO | WO 2012/028205 A1 * | 3/2012 | ............... | H04B 7/04 |

OTHER PUBLICATIONS

3GPP TSG RAN WG1 Meeting #57, San Francisco, USA, May 4-8, 2009; "CoMP Operational Mode Feedback Discussions"; R1-091869; 5 pgs.

3GPP TSG RAN WG1 Meeting #57, San Francisco, USA, May 4-8, 2009; "CoMP cell set selection and performance evaluation considerations"; R1-091759; 5 pgs.

\* cited by examiner

| subframe # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| report type | TSI | RI | | CQI/PMI | | | RI | | CQI/PMI | | TSI/RI | | | CQI/PMI | | | RI | | CQI/PMI | |

(B)

| subframe # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| report type | TSI/RI | | | CQI/PMI | | | | | CQI/PMI | | TSI/RI | | | CQI/PMI | | | | | CQI/PMI | |

FIG 3

DYNAMIC TRANSMISSION SET INDICATION

FIELD

The present invention relates to the field of mobile communication and scenarios in which coordinated multipoint transmission is supported. More particularly, the present invention relates to methods, apparatuses, and computer program products related to a terminal and a radio transceiver device, which improve such scenarios.

BACKGROUND

In the development of radio communication systems, in particular cellular communication (like for example GSM (Global System for Mobile Communication), GPRS (General Packet Radio Service), HSPA (High Speed Packet Access), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved or advanced radio access networks (like for example the Evolved Universal Terrestrial Radio Access Network (E-UTRAN)) or as being part of a long-term evolution (LTE) or LTE-Advanced, also generally referred to as International Mobile Communications-Advanced (IMT-A). Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture.

In the following, for the sake of intelligibility, LTE (Long-Term Evolution according to 3GPP terminology) or, specifically, LTE-Advanced is taken as a non-limiting example for a radio access network of cellular type being applicable in the context of the present invention and its embodiments. However, it is to be noted that any kind of radio access network of cellular type, such as GSM, GPRS, HSPA and/or UMTS, may likewise be applicable, as long as it exhibits comparable features and characteristics as described hereinafter.

As a particular example, the present invention is applicable to 3GPP 36 series standards.

In the development of cellular systems in general, and access networks in particular, cellular network systems are proposed as one concept. In the context of LTE or LTE-Advanced, cellular networks, the cells are typically deployed by base stations denoted as evolved Node_B's (eNBs) (also referred to as radio transceiver). The network environment, i.e. the base stations and/or cells defined by those may be implemented by the same or different radio access technologies.

Generally, in such cellular networks, a terminal or user equipment UE is served by a cell defined by a base station. In case of a moving/roaming terminal, however, a terminal has to know to which other (neighboring) base station or cell it can be handed over. Therefore, the terminal receives also some signals from another base station. Hence, a terminal may also be "resident" in the coverage of more than one cell, i.e. in the coverage of its serving cell and some neighboring cells.

In such scenario, and related to LTE-Advanced standardization, it has been discussed whether data transmission from multiple cells towards one terminal should be supported; this is denoted as "Coordinated Multipoint Transmission" (COMP).

So far, 3GPP only discussed very general aspects related to this topic. In the recent discussions in 3GPP related to CoMP, the main concern in terms of feasibility of CoMP arises from the fact that very fast (practically zero-delay) communication is required between the cooperating radio transceivers or base stations, eNBs.

This issue can be avoided by restricting the CoMP operation to take place within one base station eNB, e.g. between different cells defined due to multiple antennas of the base station. (Sometimes, such a cell may also be referred to as sector).

However, many terminals UE might be located in the gray area between CoMP operation and single cell transmission (SiC) operation.

Hence, it is thus difficult for the base station or the radio network controller to decide on the mode of operation, SiC or CoMP, for the terminals it is serving and/or for the terminals within the base station's coverage but not assigned to the base station as a serving base station.

The main discussion in 3GPP in terms of CoMP so far focuses on independent per-cell feedback. That is, any decision is uniformly applied to the cell, i.e. at least to all the terminals served by the cell. Optional inter-cell adjustment and/or joint feedback is also discussed.

Joint feed back refers to the case when a single UE feed back the CSI assuming joint transmission from multiple cells. So the single UE sends the feedback typically to a single serving cell. One option could be to define that a UE provides a channel state indication, CSI, feedback for both the SiC mode and the CoMP mode simultaneously, or to have those two reports feeded back alternatingly in time in a predefined manner. This, however, would be clearly suboptimal solution since only half of the reports would actually contain relevant information for the eNodeB.

Thus, according to one aspect of the current discussion on this topic, the base station or radio resource control needs to decide partly blindly on the SiC or CoMP mode for the terminals served and/or within its coverage. This will most likely result in non-satisfactory operations due to possibly inadequate decisions.

Moreover, according to another aspect of the current discussion on this topic, the amount of information to be fed back from a terminal blocks processing resources of the terminal to acquire all this information and in particular will overload the assigned signaling channels which may need to carry also other necessary information.

Accordingly, there is a demand for mechanisms to be implemented in methods and apparatuses, for improving scenarios in which a terminal may communicate in a single cell transmission mode (SiC) as well as in coordinated multipoint transmission mode (CoMP).

SUMMARY

Embodiments of the present invention aim at addressing at least part of the above issues and/or problems.

According to an exemplary first aspect of the present invention, there is provided a method comprising: performing communication transmission between at least one radio transceiver and a terminal in a cellular network based on one of at least two transmission set definitions for the communication, wherein a respective transmission set definition defines at least the number of cells from which the user equipment receives data transmissions, measuring, for each of the transmission set definitions, a transmission state for the user equipment, selecting, based on the transmission state, at least one transmission set definition to be used for communication between the at least one radio transceiver and the terminal, and feeding back the at least one selected transmission set definition to the radio transceiver device for dynamic transmission set assignment.

According to an exemplary second aspect of the present invention, there is provided a method, comprising performing communication transmission between at least one radio transceiver and a terminal in a cellular network based on one of at least two transmission set definitions for the communication, wherein a respective transmission set definition defines at least the number of cells from which the user equipment receives data transmissions, receiving, from the terminal, at least one transmission set definition at the radio transceiver device, and assigning the received transmission set definition for further communication.

According to further developments or modifications of the first and/or second aspect, one or more of the following applies:
  the at least two transmission set definitions define whether the terminal is involved in a single cell transmission or a multi-cell transmission;
  a transmission set definition identifies a respective individual cell of a transmission set consisting of one or more cells;
  the at least two transmission set definitions are configured based on long term information exchanged in radio resource control signaling between the terminal and the at least one radio transceiver;
  the feeding back and/or receiving is performed periodically;
  the feeding back and/or receiving is performed aperiodically;
  the information fed back and/or received comprises at least one of: a transmission set indicator, TSI, a rank indicator, RI, and a channel quality indicator, CQI, and a precoding matrix indicator, PMI, associated to the TSI/RI values;
  the feeding back and/or receiving uses a physical uplink control channel, PUCCH, from the user equipment to the radio transceiver device;
  the feeding back and/or receiving uses a physical uplink signaling channel, PUSCH, from the user equipment to the radio transceiver device.

According to an exemplary third aspect of the present invention, there is provided an apparatus comprising transceiver means configured to perform communication transmission between at least one radio transceiver and a terminal in a cellular network based on one of at least two transmission set definitions for the communication, wherein a respective transmission set definition defines at least the number of cells from which the user equipment receives data transmissions, measurement means configured to measure, for each of the transmission set definitions, a transmission state for the user equipment, control means configured to select, based on the transmission state, at least one transmission set definition to be used for communication between the at least one radio transceiver and the terminal, and wherein the transceiver means is configured to feed back the at least one selected transmission set definition to the radio transceiver device for dynamic transmission set assignment.

According to an exemplary fourth aspect of the present invention, there is provided an apparatus comprising transceiver means configured to perform communication transmission between at least one radio transceiver and a terminal in a cellular network based on one of at least two transmission set definitions for the communication, wherein a respective transmission set definition defines at least the number of cells from which the user equipment receives data transmissions, wherein the transceiver means is configured to receive, from the terminal, at least one transmission set definition at the radio transceiver device, and control means configured to assign the received transmission set definition for further communication.

According to further developments or modifications of the third and/or fourth aspect, one or more of the following applies:
  the at least two transmission set definitions define whether the terminal is involved in a single cell transmission or a multi-cell transmission;
  a transmission set definition identifies a respective individual cell of a transmission set consisting of one or more cells;
  the at least two transmission set definitions are configured based on long term information exchanged in radio resource control signaling between the terminal and the at least one radio transceiver;
  the transceiver means is configured to feed back and/or to receive periodically;
  the transceiver means is configured to feed back and/or to receive aperiodically;
  the information fed back and/or received comprises at least one of: a transmission set indicator, TSI, a rank indicator, RI, and a channel quality indicator, CQI, and a precoding matrix indicator, PMI, associated to the TSI/RI values;
  transceiver means is configured to use, for feedback and/or reception, a physical uplink control channel, PUCCH, from the user equipment to the radio transceiver device;
  the transceiver means is configured to use, for feedback and/or reception, a physical uplink signaling channel, PUSCH, from the user equipment to the radio transceiver device.

According to an exemplary fifth aspect of the present invention, there is provided a corresponding computer program or computer program product including a program comprising software code portions being arranged, when run on a processor of an apparatus, to perform a method as defined under the first and/or second aspect above and/or developments or modifications thereof.

According to further developments or modifications of the present invention, the computer program or computer program product according to the exemplary fifth aspect comprises a computer-readable medium on which the software code portions are stored, and/or the program is directly loadable into a memory of the processor.

By way of exemplary embodiments of the present invention, there are provided mechanisms for improving scenarios in which a terminal may communicate in a single cell transmission mode (SiC) as well as in coordinated multipoint transmission mode (CoMP).

Such mechanisms according to exemplary embodiments of the present invention may be particularly applicable in the context of LTE/LTE-Advanced networks, and for example in the 3GGP 36 series standards.

According to exemplary embodiments of the present invention, there is provided a support for terminal, US, oriented transmission-set selection. Switching between single cell transmission SiC and CoMP is one case. In this regard, there are disclosed according to exemplary embodiments of the invention, feedback signaling mechanisms that enables dynamic switching between CoMP and single cell SiC operation for a SiC/CoMP enabled scenario in a cellular network.

In order to enable dynamic switching between single cell and CoMP transmission, exemplary embodiments of the invention disclose a way of providing CSI feedback for both modes of operation.

Exemplary embodiments further disclose enhancements on the feedback design, since after all only the UE knows the exact channel response.

Thus, exemplary embodiments of the present invention provide support for dynamical transmission set selection.

The greatest benefit in at least some of the exemplary embodiments is the reduction in the UL feedback signaling overhead. This is due to the fact that the CSI is only signaled for a selected subset, e.g. the "best" transmission set indicated by the TSI, not for multiple ones or all.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS

The present invention is described herein with reference to particular non-limiting examples and to what are presently considered to be conceivable embodiments of the present invention. A person skilled in the art will appreciate that the invention is by no means limited to these examples, and may be more broadly applied.

Generally, the present invention and its embodiments relate to cellular systems also referred to as cellular networks. As described above, in this context, LTE/LTE-Advanced networks are particularly referred to herein, while the present invention and its embodiments could equally be applied to other cellular standards as well.

For the purpose of the present description, the following abbreviations (in alphabetical order), if used, have the following meaning
CoMP Coordinated Multi-Point Transmission
CQI Channel Quality Indicator
CRS Common Reference Symbols
CSI Channel State Information
CSI-RS Channel State Information Reference Symbols
DCI Downlink Control Information
DM RS Demodulation Reference Symbols
DRS Dedicated (UE-Specific) Reference Symbols
eNB, eNodeB Basestation
PDCCH Physical Downlink Control Channel
PDSCH Physical Downlink Shared Channel
PUCCH Physical Uplink Control Channel
PUSCH Physical Upink Shared Channel
PMI Precoding Matrix Indicator
RI Rank Indicator
RRC Radio Resource Control
SiC Single Cell Transmission
TM Transmission Mode
TSI Transmission Set Indicator
TX Transmit(ter)
UE User Equipment, terminal In particular, the present invention and its embodiments are mainly described in relation to 3GPP specifications being used as non-limiting examples for certain exemplary network configurations and deployments. In particular, an LTE/LTE-Advanced network environment is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment comprising cellular networks may also be utilized as long as compliant with the features described herein.

Hereinafter, various embodiments and implementations of the present invention and its aspects or embodiments are described, if applicable using several alternatives. It is generally noted that, according to certain needs and constraints, all of the described alternatives may be provided alone or in any conceivable combination (also including combinations of individual features of the various alternatives).

In the following, exemplary embodiments of the present invention are described with reference to methods, procedures and functions and devices.

Figure 1:
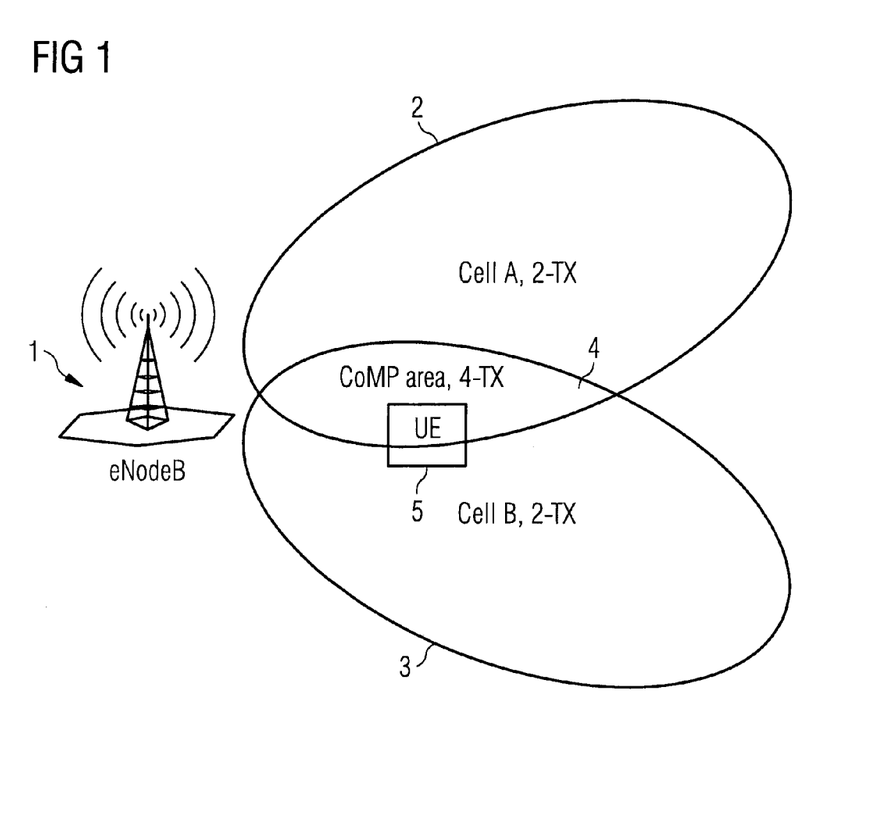
FIG. 1 shows a schematic diagram of a part of a cellular network.

FIG. 1 shows a schematic diagram of a part of a cellular network. Generally, a base station eNodeB, 1, defines a cell by its coverage area. In case of plural base stations in the same area, each has its "surrounding" cell. In case of overlapping cell coverage of plural (neighboring) cells, a terminal UE, 5, residing in the overlapping area, if enabled for CoMP, may perform coordinated multipoint transmission CoMP operation or single cell transmission SiC. If not enabled, the terminal performs single cell transmission SiC only.

A single base station, however, may also define more than one cell by virtue of being equipped with plural (more than one) transmission antennas. Each antenna of the base station/radio transceiver eNodeB may define one cell, e.g. in differing directions.

FIG. 1 shows an exemplary case of a single base station 1 being equipped with four transmit antennas. Two respective transmit antennas, denoted as 2-TX, are assigned to respective cells, denoted as Cell A, 2, and Cell B, 3, respectively. The overlapping cell area referred to as CoMP area, 4, benefits from the situation that it is in the coverage of all 4 transmit antennas (denoted as 4-TX).

In such an example scenario, transmission coordination taking place between the two cells A and B (reference numeral 2 and 3) of the single eNodeB, 1, can achieve a reasonable gain with practical implementation. The UE 5 on the border area of the two cells, i.e. in the overlapping area of the two cells A and B, benefits from the CoMP transmission from all the four antennas in the CoMP area (two antennas in each cell).

However, from the base station's 1 side, it is difficult to decide whether to use CoMP or SiC (Single Cell) transmission beforehand since most UEs are located in some "gray area". Hence, the present invention, according to exemplary embodiments thereof, transfers such decision to the terminal UE 5, since the UE knows the best whether CoMP or SiC should be performed from its viewpoint. Hence, according to exemplary embodiments of the present invention, the decision on the selection of the transmission mode CoMP or SiC is taken by the UE.

A transmission mode is defined in a transmission set definition which defines at least the number of cells from which a user equipment receives data transmissions. A plurality of such transmission set definitions are configured as a result of negotiations between the user equipment UE and the base station eNodeB. A transmission set definition may also be referred to as configuration.

Thus, under an exemplary method aspect of the present invention in relation to the terminal UE, such a method for dynamically indicating to the base station its preferred transmission set is implemented at the terminal UE side.

Figure 4:
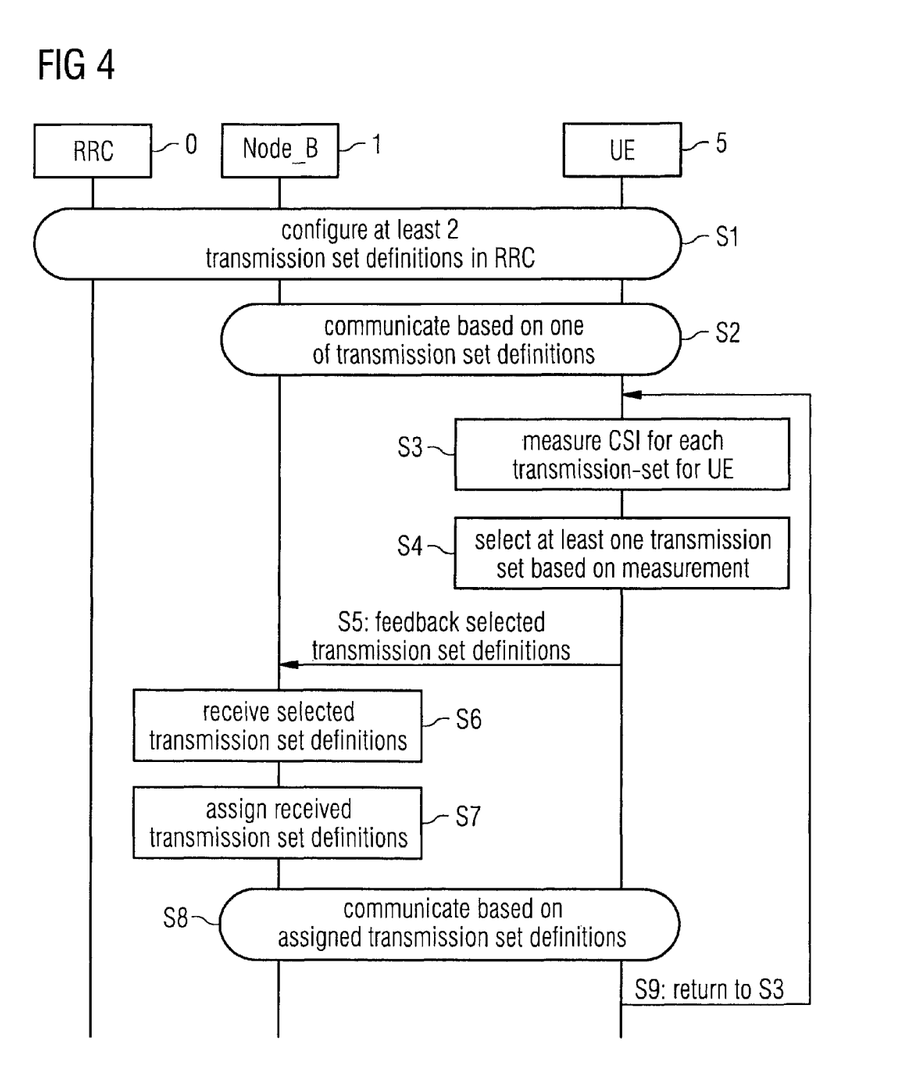
FIG. 4 shows a signaling flowchart of interactions between a terminal UE and a radio transceiver or base station Node_B.

The proposed procedure is divided in the following steps, which are schematically illustrated in FIG. 4.

FIG. 4 shows a signaling flowchart of interactions between a terminal UE and a radio transceiver or base station Node_B according to an exemplary aspect of the present invention. Entities involved are a radio resource control RRC denoted with numeral 0, a base station Node_B denoted with numeral 1 and a terminal or user equipment denoted with numeral 5. Procedures performed by respective ones of those entities individually or in cooperation are labeled as S1 through S9.

In procedure or step S1, multiple configurations (i.e. transmission set definitions) are negotiated between UE and eNB according to the long term information exchange involving radio resource control RRC.

Each configuration corresponds to a transmission set definition.

For example,

Configuration0 means the transmission set definition includes sector 0 (serving cell, e.g. Cell_A in FIG. 1) only (single cell transmission, SiC mode), while Configuration 1 means the transmission set definition includes sector 0 and sector 1 (one neighbor sector, hence, the overlapping area of cell_A and cell_B in FIG. 1), as a dual-sector transmission as an example of coordinated multipoint, CoMP, transmission mode.

Alternatively, or additionally, each configuration may correspond to a different cell, enabling fast cell (re-) selection. For example, a configuration 2 may define the SiC mode for the UE using cell_B only. Also, a configuration 3 may mean the transmission set definition includes sector 0, sector 1, and sector 2 (two neighbor sectors, hence, an overlapping area of cell_A, cell_B, and a cell C, not shown in FIG. 1), as a triple-sector transmission as a further example of coordinated multipoint, CoMP, transmission mode. CoMP transmission mode is thus not to be regarded as being limited to two cells.

Thus, the at least two transmission set definitions define whether the terminal 5 is involved in a single cell transmission or a multi-cell transmission, wherein a transmission set definition identifies a respective individual cell of a transmission set consisting of one or more cells.

For example, assume three base stations A, B, C, with partly overlapping coverage. Then, the following transmission set definitions are possible:

Set 1: SiC using/identifying base station A,
Set 2: SiC using/identifying base station B,
Set 3: SiC using/identifying base station C,
Set 4: CoMP using/identifying base stations A&B,
Set 5: CoMP using/identifying base stations A&C,
Set 6: CoMP using/identifying base stations B&C,
Set 7: CoMP using/identifying bases stations A&B&C.

In procedure or step S2, the terminal 5 communicates with the base station 1 in one of the modes defined by one of the transmission set definitions. As a non limiting example, as a default, communication may be assumed to start in SiC mode.

Thereafter, in procedure or step S3, the terminal UE, 5, performs channel state indicator, CSI, measurements for all the transmission set definitions (e.g. Sets 1 through 7 outlined above) and, hence, cells and/or sectors in each configuration, SiC as well as CoMP, defined by the multiple transmission set definitions. CSI as a parameter comprises at least Channel Quality Indicator CQI and Precoding Matrix Indicator PMI.

Those measurement results enable the terminal 5 to decide which configuration (transmission set definition) is the best. Such decision is accompanied by a selection in procedure/step S3 of at least one ("best") transmission set definition.

Then, in step S3, the terminal UE, 5, reports the selected ("best") transmission set or sets definition using a feedback channel carrying the information about the "best" transmission set or sets to the base station eNodeB 1 using as a parameter a Transmission Set Indicator (TSI). TSI may have e.g. only 1 or 2 bits since generally only a very limited number of configurations is needed. For example, with 2 bits of TSI, up to four transmission set definitions can be encoded. A single bit TSI, however, is already sufficient to distinguish between SiC mode using the serving cell and CoMP mode using the serving cell and one neighboring cell (dual-cell CoMP mode) in the overlapping cell area.

TSI is similar to Rank Indicator RI in the sense that TSI would condition the RI, PMI and CQI feedback. This simply means that the RI, PMI and CQI are derived based on and/or assuming the selected TSI. So basically the RI, PMI and CQI are only valid for the transmission set indicated by the TSI.

Thereafter, the signaled feedback is received at the side of the base station (Node_B) 1 in procedure/step S5. Based on the received signaled transmission set definition, the base station 1 in procedure/step S7 assigns the received transmission set definition for subsequent communication with the terminal. In the following procedure/step S8, the communication between base station 1 and terminal 5 is then based on the assigned transmission set definition.

Finally, as indicated by S9, the flow returns to procedure S3 in which the terminal performs again its measurements. Of course, those measurements in S3 are not disrupting an ongoing communication of step S2 and/or S8. Rather, the illustration in FIG. 4 is simplified for explanatory purposes only and those measurements are conducted in parallel and/or during ongoing communication. The interval between such measurements depends on the settings of the terminal which may be prescribed by the standard to which the terminal is conformant. As described above, FIG. 4 focuses on method aspects and signaling between entities involved.

Figure 5:
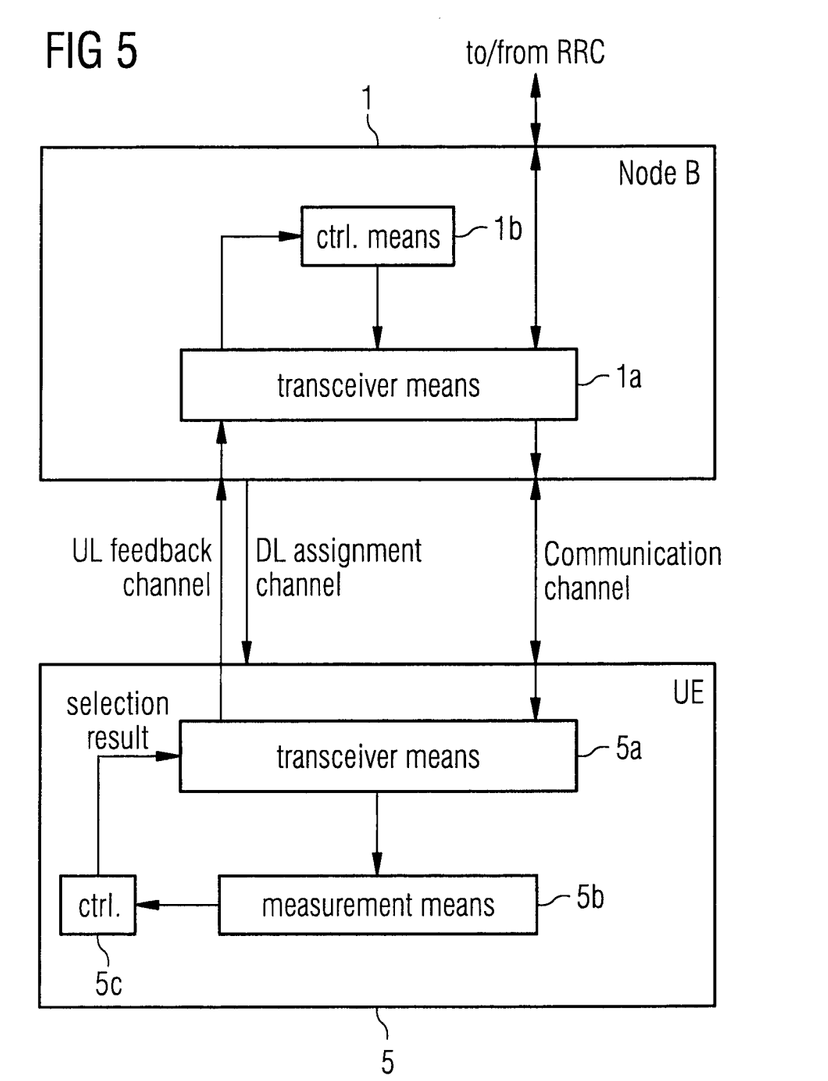
FIG. 5 shows block circuit diagrams of a terminal UE and a radio transceiver or base station Node_B.

FIG. 5, in turn, shows block circuit diagrams of a terminal UE, 5, and a radio transceiver or base station Node_B, 1. As shown in FIG. 5, the base station 1 has an interface to/from the radio resource control RRC. The base station 1 has one or more bidirectional communication channels with the terminal 5 and one or more bidirectional control channels with the terminal 5. For the purpose of the present description, control channels in uplink from the terminal 15 to the bases station 1 are labeled feedback channel, while control channels in downlink from the base station 1 to the terminal 5 are labeled assignment channel.

The feedback channels convey the selected transmission set definition (see S5 in FIG. 4), while the assignment channels convey the information on which mode, SiC or CoMP, is assigned (see S7/S8 in FIG. 4), so that terminal 5 and base station 1 are enabled to switch to the same transmission set definition.

In one possible scenario, the terminal may switch to the selected transmission set and inform the base station in uplink. Then the base station would be the "slave" and the terminal would be the "master". Then, a downlink assignment would be superfluous. In another possible scenario, the terminal switches only to the assigned transmission set upon receiving the assigned transmission set from the base station in downlink. Then the base station would be the "master" and the terminal would be the "slave".

The Node_B 1 as an apparatus, as shown in FIG. 5, comprises a transceiver means 1a configured to perform communication transmission between at least the base station 1 and a terminal 5 in a cellular network based, and based on one of at least two transmission set definitions for the communication, wherein a respective transmission set definition defines at least the number of cells from which the user equipment receives data transmissions. The transceiver means 1a is configured to receive, in uplink from the terminal 5, at least one transmission set definition via a feedback channel. The base station 1 further comprises control means 1b configured to assign the received transmission set definition for further communication with the terminal. The control means assign the transmission set definition to be used/assigned to the base station and in an exemplary embodiment inform the assigned transmission set definition in downlink via an assignment channel to the terminal 5.

On the other hand, as shown in FIG. 5, a terminal 5 as an apparatus comprises transceiver means 5a configured to perform communication transmission between at least one radio transceiver 1 and the terminal 5 in a cellular network based on one of at least two transmission set definitions for the communication, wherein a respective transmission set definition defines at least the number of cells from which the user equipment receives data transmissions. The terminal further comprises measurement means 5b configured to measure, for each of the transmission set definitions and, hence, cells, a transmission state, such as a channel state and/or channel state indicator CSI for the user equipment 5, and control means 5c configured to select, based on the transmission state, e.g. channel state CSI, at least one transmission set definition to be used for communication between the at least one radio transceiver 1 and the terminal 5. The transceiver means is configured to feed back the at least one selected transmission set definition to the radio transceiver device 1 for dynamic transmission set assignment. Note that other parameters than channel state and/or channel state indicator may equally be used to represent the transmission state.

So far, aspects of the invention were described with a focus on the method/procedures involved as well as in relation to the apparatus aspects involved. Hereinafter, now aspects of the invention in relation to the feedback signaling sent from the terminal 5 in uplink to the base station 1 and received at the base station are described.

Several feedback scenarios (when considered from the terminal side) are basically possible:

1) Periodic feedback of at least one selected transmission set definition, or
2) Aperiodic feedback of at least one selected transmission set definition.

In case 1) above, i.e. in case of periodic feedback, the transport set indicator TSI can be jointly encoded with the rank indicator RI, or can be transmitted separately in different time instances (referred to as subframes) Insofar, new feedback types are defined.

The terminal UE performs feedback of the channel quality indicator CQI and the precoding matrix indicator PMI for the configuration (transmission set definition) indicated by latest reported TSI/RI value pair. The receiving base station eNB interprets the CQI/PMI feedback based the latest received TSI and RI values.

If TSI and RI are transmitted separately, they may have different periodicity. In such case, normally the periodicity of TSI is be larger than that of RI which means that TSI is transmitted less frequently as the RI.

Figure 2:
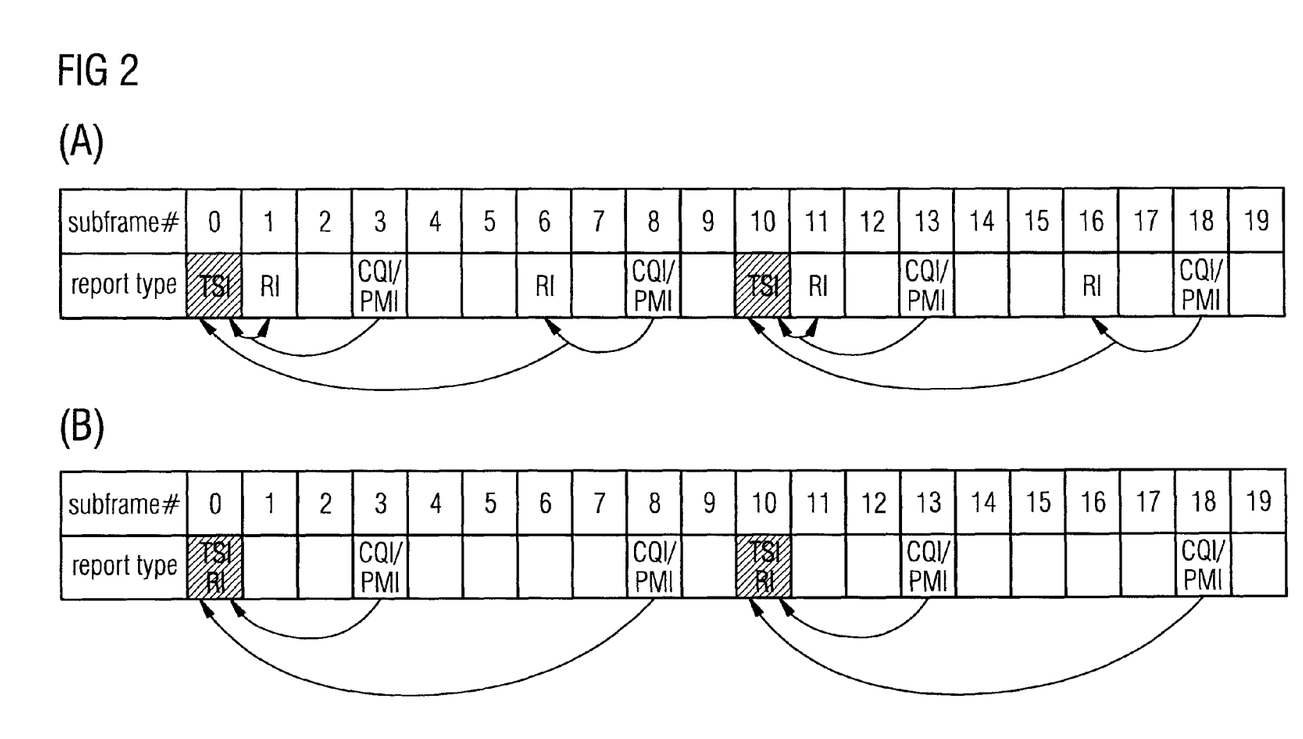
FIG. 2 shows data arrangements for periodic feedback of information using the physical uplink control channel PUCCH.

FIG. 2 shows data arrangements for periodic feedback of information using the physical uplink control channel PUCCH. FIG. 2 shows in FIG. 2A the situation in which TSI is sent alone (separately from RI), while FIG. 2B shows the situation of TSI being jointly sent together with RI.

With periodic CSI feedback on PUCCH, those are the two basic ways of conveying the TSI.

In both, FIGS. 2A and 2B, the subframes (1 subframe typically corresponding to 1 ms) are illustrated together with the respective feedback information that is conveyed in the respective subframe number.

FIG. 2A illustrates that in subframes #0, #10, . . . the TSI is signalled separately from RI. RI is signalled separately from TSI in subframes #1, #6, #11, #16, . . . . Apparently, TSI has larger periodicity than RI as TSI is transmitted once per ten subframes while RI is transmitted twice per ten subframes. In subframes #3, #8, #13, and #18 the CQI/PMI information is conveyed, which relates to the latest TSI/RI values. Thus, CQI/PMI in subframe #8 relates to TSI/RI conveyed in subframes #0 and #6, respectively.

FIG. 2B illustrates that in subframes #0, #10, . . . the TSI is signalled jointly with RI. In subframes #3, #8, #13, and #18 the CQI/PMI information is conveyed, which relates to the latest TSI/RI values. Thus, CQI/PMI in subframes #3 and #8 relates to TSI/RI both conveyed in subframe #0. CQI/PMI in subframes #13 and #18 relates to TSI/RI both conveyed in subframe #10.

Those relations and/or interdependencies between CQI/PMI and TSI/RI are illustrated by arrows in FIGS. 2A and 2B.

Figure 3:
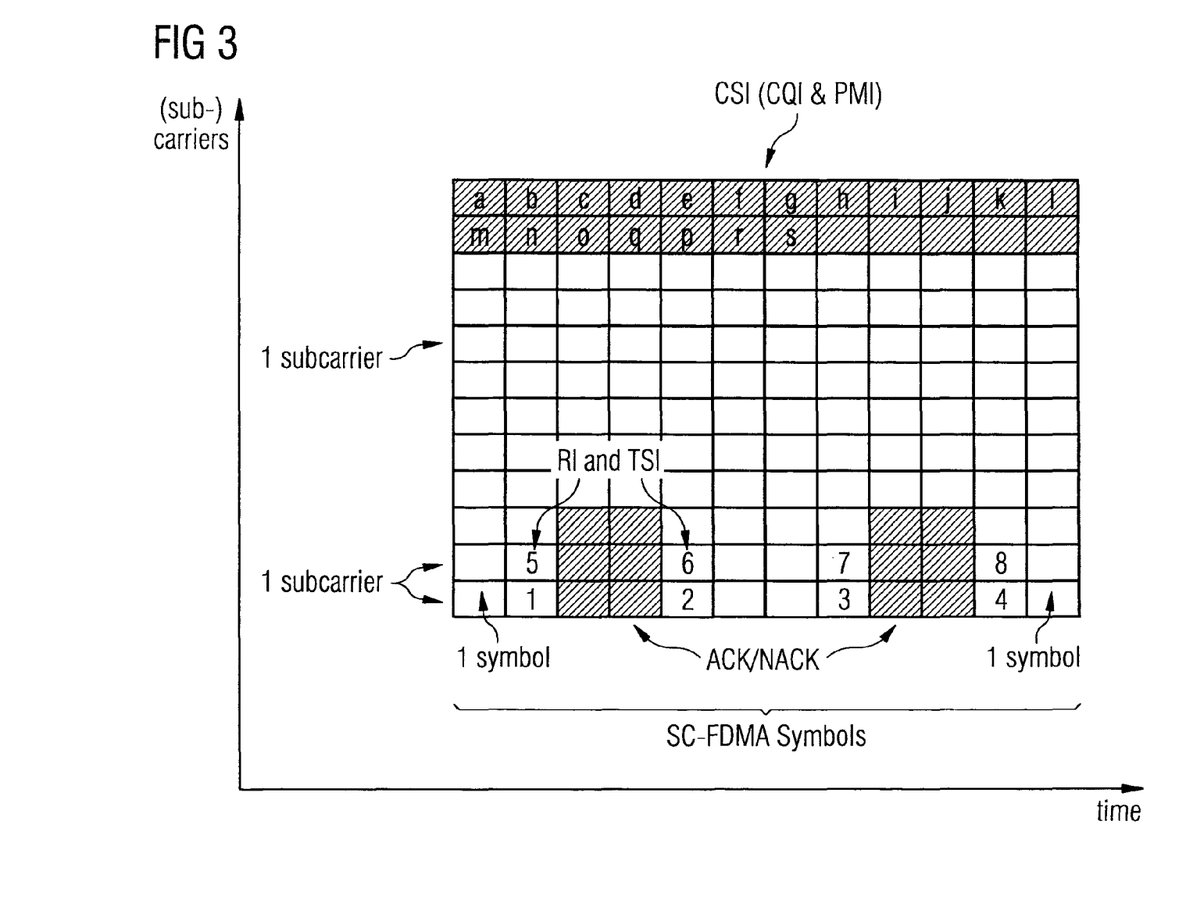
FIG. 3 shows data arrangements for aperiodic feedback of information using the physical uplink signaling channel PUSCH.

In case 2) above, i.e. in case of aperiodic feedback, the TSI is included into each report. A "report" means here the information contained in a respective subframe. Again, the TSI could be jointly encoded with the RI, i.e. in the same symbol or symbols. According to an aspect of the present invention, aperiodic feedback is accomplished using the physical uplink signaling channel PUSCH (FIG. 3). An aperiodic feedback is for example triggered by the base station eNB. The base station eNB may request the UE to provide feedback by indicating it with the PDCCH UL grant.

In the case of aperiodic CSI feedback, the reports are always self-contained, i.e. all the CSI (comprising CQI, PMI) is included into a single report transmitted during a single subframe and there are no inter-dependencies between the reports. Since the payload of CQI, PMI may depend on the value of TSI, it makes sense to encode it separately from them, i.e. in different symbols. According to an exemplary solution TSI is encoded jointly with RI as shown in FIG. 3.

FIG. 3 shows data arrangements for aperiodic feedback of information using the physical uplink signaling channel PUSCH. FIG. 3 shows a matrix of SC-FDMA symbols (single carrier frequency-division multiple access). The symbols are allocated in a time vs. (sub-)carrier domain. Time domain is illustrated in horizontal direction and carrier domain in vertical direction, as depicted by the axes in FIG. 3. (Reference symbol blocks are omitted from FIG. 3 for clarity.) The matrix as such corresponds to one subframe (i.e. typically 1 ms). Each matrix element may correspond to a transmitted symbol. Acknowledgement and non-acknowledgement ACK/NACK information is allocated to specific symbols in time/sub-carrier domain as illustrated by the hatched matrix elements.

Adjacent to those ACK/NACK symbols, the TSI/RI values are allocated to the adjacent matrix elements, starting in the lowest sub-carrier ("bottom line" of matrix) and extending "rightward" in time, as denoted by numbers 1, 2, 3, and 4 in FIG. 3. If more ACK/NACK and/or TSI/RI information is to be conveyed, such payload is allocated to corresponding symbols in "higher" sub-carriers. Generally, 8 symbols are sufficient for TSI/RI which are normally represented by 1 or 2 bits only. The CST (comprising CQI and PMI) are allocated to the symbols starting with the "highest" subcarrier, i.e. starting in the top left matrix element and extending from there first to the right (in time domain) and then (if more payload needs to be carried) starts to use lower sub-carriers. This is exemplarily represented by labels a, b, c, . . . l, m, . . . s in FIG. 3. More but also less symbols as the number illustrated in FIG. 3 may be used.

As an optional method, RI/PMI/CQI feedback for multiple TSI values can be feedback together. This would allow the base station to decide on transmission set selection according to the instantaneous load in the sector. This is important as dual cell transmission mainly provides gain in the case where there are unused transmission resources in the non-serving sector.
 a) Such multiple reports could be configured simply by supporting that UE can be configured to report N-best choice for TSI (thus more than one).
 b) Another way of having multiple reports is that UE cyclically feedback RI/CQI/PMI for each of the TSI value.

If so, the control means 1b of the base station in FIG. 5 is configured to perform a corresponding decision/selection out of the plurality of TSI values so as to identify the best suited transmission set definition for the terminal concerned. Likewise, in such modified scenario, in FIG. 4 the base station would perform such decision/selection in a step S6a after step S6 before step S7. Also, step S7 would be followed by a step S7a in which the base station informs the terminal via a downlink assignment channel of the selected/decided transmission set definition, i.e. whether to perform communication is SiC or CoMP mode.

In general, it is to be noted that respective functional blocks or elements according to described aspects can be implemented by any known means, either in hardware and/or software, respectively, if it is only adapted to perform the described functions of the respective parts. The method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above described concepts of methodology and structural arrangement are applicable.

In view of the above, there are provided methods and apparatuses and computer program products for dynamic transmission set indication in scenarios in which a terminal is enabled for single cell transmission SiC as well as for coordinated multipoint transmission CoMP. To this extent, appropriate information is being fed back from the terminal to the base station via feedback signaling channels. The decision on which transmission mode defined by respective transmission set definitions is used can be taken by the terminal or, in a modified scenario, by the base station, based on the information fed back.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method, comprising:
performing communication transmission between at least one radio transceiver and a user equipment in a cellular network based on one of at least two transmission set configurations for the communication, wherein a respective transmission set configuration defines at least the number of cells from which the user equipment receives data transmissions;
measuring, for each of the transmission set configurations, a channel condition for the user equipment;
selecting, by the user equipment and based on the measured channel condition, a transmission set configuration to be used for subsequent communication between the at least one radio transceiver and the user equipment;
feeding back a transmission set indicator indicating the selected transmission set configuration to the radio transceiver device for dynamic transmission set assignment; and
transmitting channel state information feedback, wherein the channel state information feedback comprises at least one of:
a channel quality indicator, and
a precoding matrix indicator,
wherein the transmitted channel state information feedback is associated with the latest reported transmission set indicator,
wherein a rank indicator, the precoding matrix indicator, and the channel quality indicator are only valid for and are derived based on and/or assuming the transmission set indicated by the transmission set indicator, and
wherein the transmission set indicator is transmitted less frequently than the channel state information feedback.

2. A method, comprising:
performing communication transmission between at least one radio transceiver and a user equipment in a cellular network based on one of at least two transmission set configurations for the communication, wherein a respective transmission set configuration defines at least the number of cells from which the user equipment receives data transmissions,
receiving, at the radio transceiver device from the user equipment, a transmission set indicator indicating a transmission set configuration selected by the user equipment,
assigning the received transmission set configuration for further communication; and
receiving channel state information feedback, wherein the channel state information feedback comprises at least one of:
a channel quality indicator, and
a precoding matrix indicator,
wherein the received channel state information feedback is associated with the latest reported transmission set indicator,
wherein a rank indicator, the precoding matrix indicator, and the channel quality indicator are only valid for and are derived based on and/or assuming the transmission set indicated by the transmission set indicator, and
wherein the transmission set indicator is received less frequently than the channel state information feedback.

3. The method according to claim 1, wherein the at least two transmission set configurations define whether the terminal is involved in a single cell transmission or a multi-cell transmission.

4. The method according to claim 3, wherein the transmission set indicator identifies a respective individual cell of a transmission set configuration consisting of one or more cells.

5. The method according to claim 1, wherein the at least two transmission set configurations are configured based on long term information exchanged in radio resource control signaling between the user equipment and the at least one radio transceiver.

6. The method according to claim 1, wherein at least one of the feeding back and the receiving is performed periodically.

7. The method according to claim 1, wherein at least one of the feeding back and the receiving is performed aperiodically.

8. An apparatus, comprising:
a transceiver configured to perform communication transmission between at least one radio transceiver and a user equipment in a cellular network based on one of at least two transmission set configurations for the communication, wherein a respective transmission set definition defines at least the number of cells from which the user equipment receives data transmissions;
a processor configured to measure, for each of the transmission set configurations, a channel condition for the user equipment;
a controller configured to select, based on the channel condition state, a transmission set configuration to be used for subsequent communication between the at least one radio transceiver and the user equipment;
wherein the transceiver is configured to feed back a transmission set indicator indicating the selected transmission set configuration to the radio transceiver device for dynamic transmission set assignment; and
wherein the transceiver is further configured to transmit channel state information feedback, wherein the channel state information feedback comprises at least one of:
a channel quality indicator, and
a precoding matrix indicator, wherein the transmitted channel state information feedback is associated with the latest reported transmission set indicator, wherein a rank indicator, the precoding matrix indicator, and the channel quality indicator are only valid for the transmission set indicated by the transmission set indicator, and wherein the transmission set indicator is transmitted less frequently than the channel state information feedback.

9. An apparatus, comprising:

a transceiver configured to perform communication transmission between at least one radio transceiver and a user equipment in a cellular network based on one of at least two transmission set configurations for the communication, wherein a respective transmission set configuration defines at least the number of cells from which the user equipment receives data transmissions, wherein the transceiver is configured to receive, from the user equipment, a transmission set indicator indicating a transmission set configuration selected by the user equipment;

a controller configured to assign the received transmission set configuration for further communication and wherein the transceiver is further configured to receive channel state information feedback, wherein the channel state information feedback comprises at least one of:

a channel quality indicator, and a precoding matrix indicator, wherein the received channel state information feedback is associated with the latest reported transmission set indicator, wherein a rank indicator, the precoding matrix indicator, and the channel quality indicator are only valid for and are derived based on and/or assuming the transmission set indicated by the transmission set indicator, and wherein the transmission set indicator is received less frequently than the channel state information feedback.

10. The apparatus according to claim 8, wherein the at least two transmission set configurations define whether the terminal is involved in a single cell transmission or a multi-cell transmission.

11. The apparatus according to claim 10, wherein the transmission set indicator identifies a respective individual cell of a transmission set configuration consisting of one or more cells.

12. The apparatus according to claim 8, wherein the at least two transmission set configurations are configured based on long term information exchanged in radio resource control signaling between the user equipment and the at least one radio transceiver.

13. The apparatus according to claim 8, wherein the transceiver is configured to periodically either feed back or receive or both feed back and receive.

14. The apparatus according to claim 8, wherein the transceiver is configured to aperiodically either feed back or receive or both feed back and receive.

15. A computer program product embodied on a non-transitory computer-readable medium in which a computer program is stored that, when the program is run on a computer, is configured to provide instructions to control or carry out the method according to claim 1.

16. A computer program product embodied on a non-transitory computer-readable medium in which a computer program is stored that, when the program is run on a computer, is configured to provide instructions to control or carry out the method according to claim 2.

17. The method according to claim 1, wherein the transmission set indicator consists of one or two bits mapped to the corresponding transmission set configuration.

18. The method according to claim 1, wherein the transmission set indicator indicates whether the subsequent communication between the user equipment and the radio transceiver device is to take place over a single cell transmission or a multi-cell transmission.

19. The apparatus according to claim 8, wherein the transmission set indicator consists of one or two bits mapped to the corresponding transmission set configuration.

20. The apparatus according to claim 8, wherein the transmission set indicator indicates whether the subsequent communication between the user equipment and the radio transceiver device is to take place over a single cell transmission or a multi-cell transmission.

21. The method according to claim 1, further comprising: encoding the transmission set indicator to a different symbol than the channel state information feedback.

* * * * *